Aug. 7, 1928.
M. FARNSWORTH
1,679,415
MACHINE FOR DRILLING AND PINNING KNIFE HANDLES AND THE LIKE
Filed Aug. 31, 1926     3 Sheets-Sheet 1
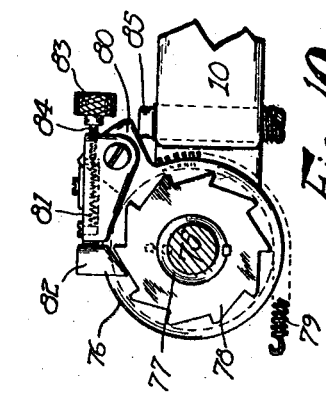
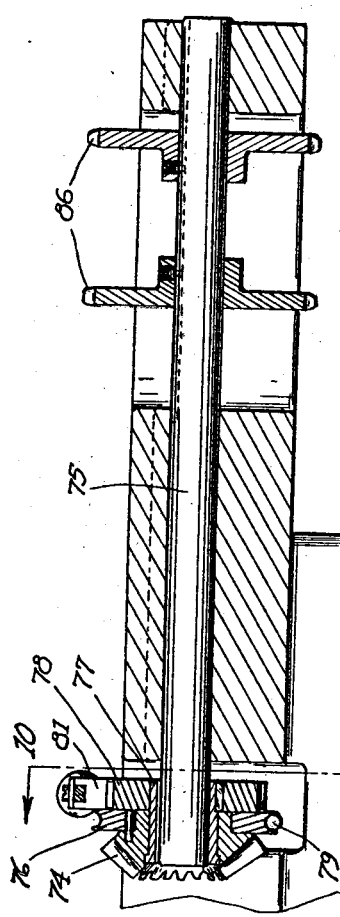
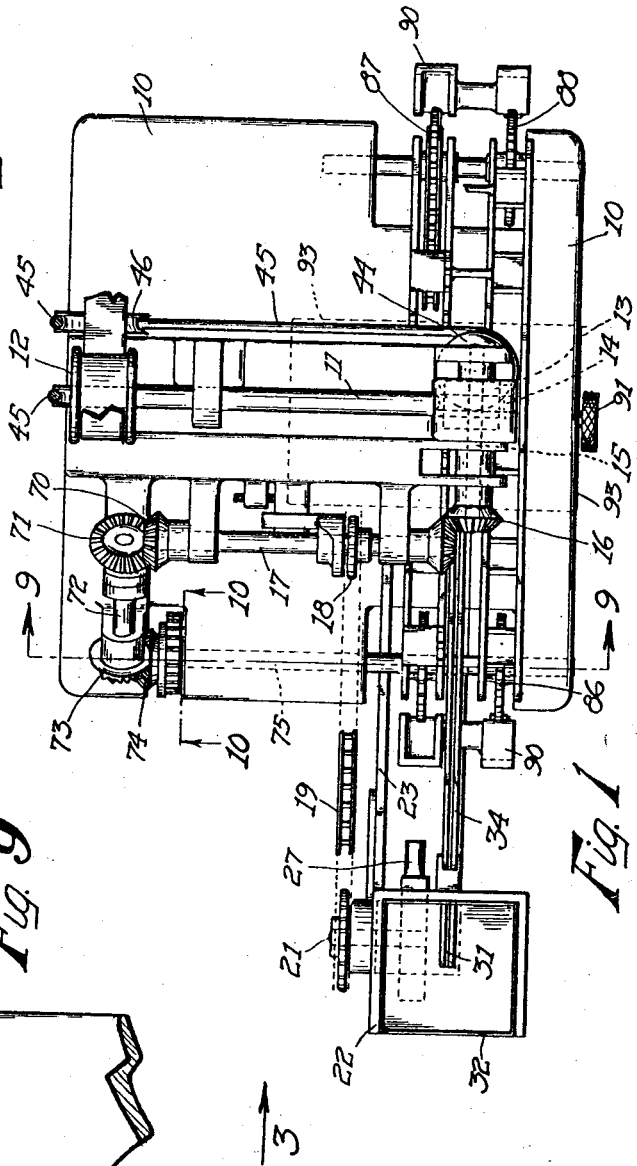
Inventor
Marshall Farnsworth
By Attorneys Aug. 7, 1928.
M. FARNSWORTH
1,679,415
MACHINE FOR DRILLING AND PINNING KNIFE HANDLES AND THE LIKE
Filed Aug. 31, 1926
3 Sheets-Sheet 2
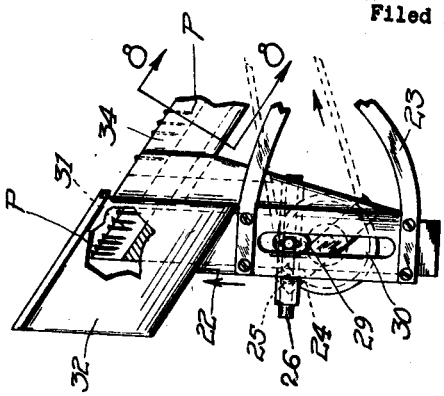
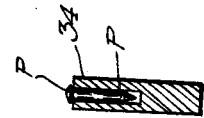
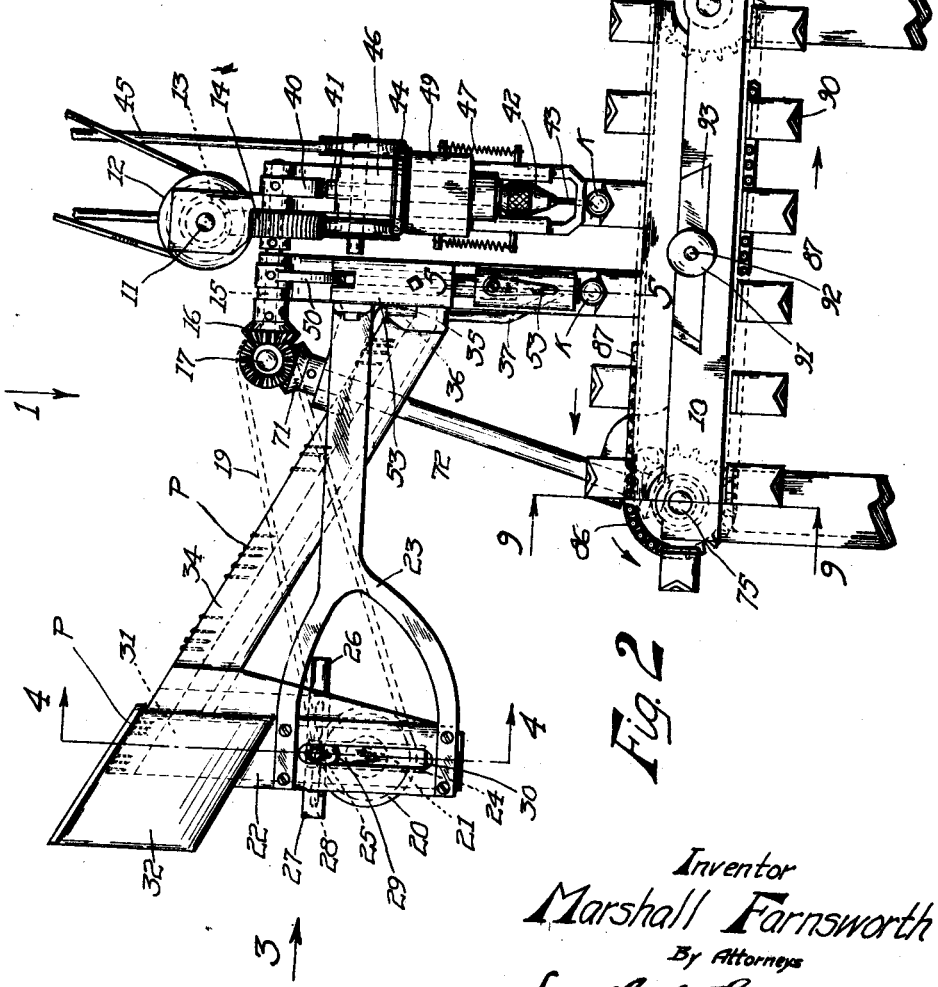
Inventor
Marshall Farnsworth
By Attorneys

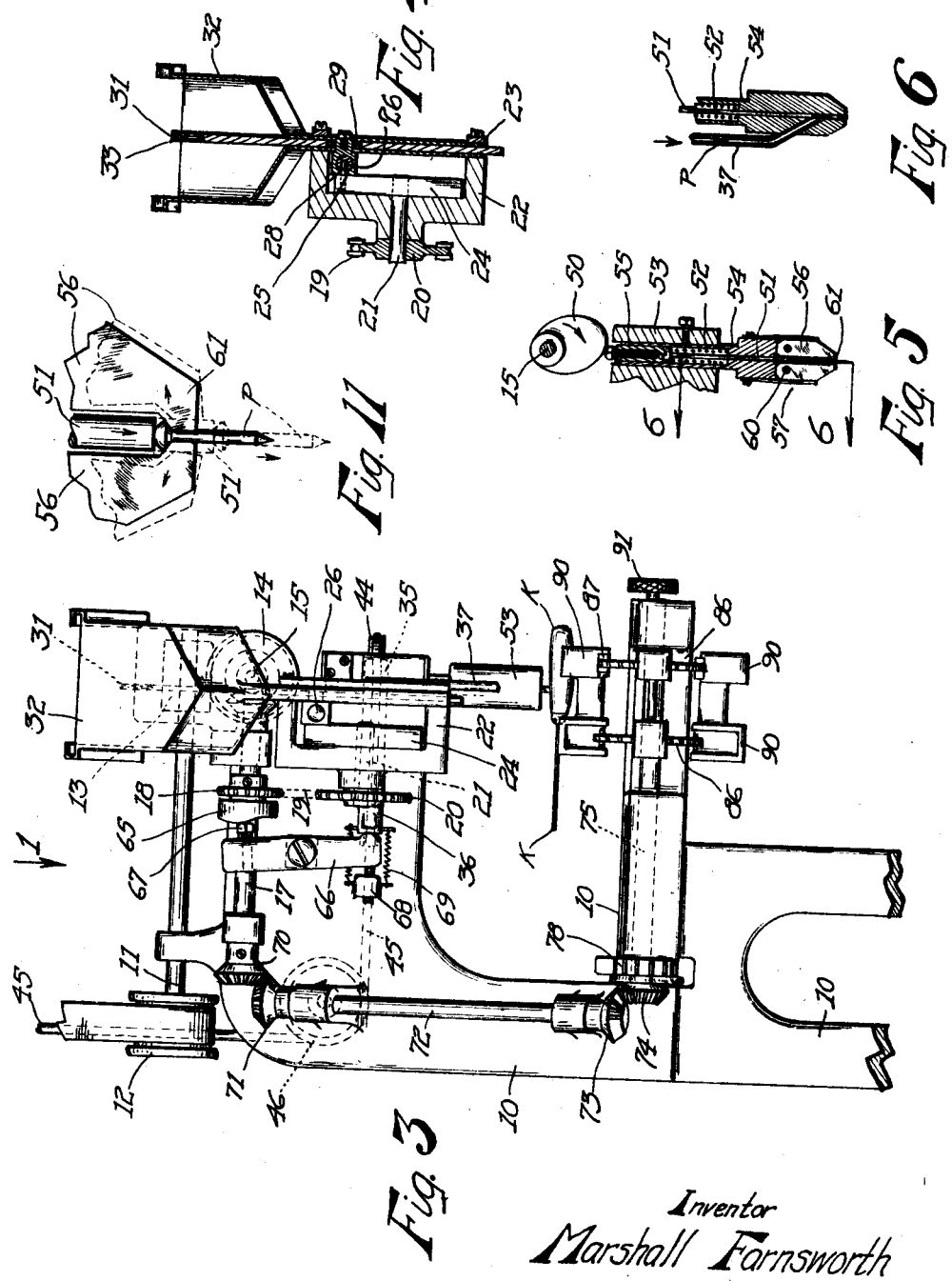

Patented Aug. 7, 1928.

1,679,415

UNITED STATES PATENT OFFICE.

MARSHALL FARNSWORTH, OF SOUTHBRIDGE, MASSACHUSETTS.

MACHINE FOR DRILLING AND PINNING KNIFE HANDLES AND THE LIKE.

Application filed August 31, 1926. Serial No. 132,780.

This invention relates to a machine for drilling the holes in knife-handles and then forcing pins into the holes for attaching the handles to the blades and permanently affixing them thereon.

The principal objects of the invention are to provide an automatic feeding device for feeding one pin at a time into a position to be taken up by the pin driving mechanism so timed with respect to the rest of the mechanism as to reach that point at the proper time for being received by the driving mechanism; to provide an improved driving mechanism actuated to force each pin into the knife handle; to provide means for simultaneously drilling a hole in another handle so that these two operations can be performed on two different handles at once; to provide means for carrying and intermittently feeding the knife handles forward one step between each two downward motions of the drill and pinning device; and to coordinate these several mechanisms so that they will work in harmony with each other and there will always be two knife handles in position to be drilled and pinned every time the handle feeding mechanism stops. The invention also involves improvements in the details of construction of these various mechanisms.

Reference is to be had to the accompanying drawings, in which

Fig. 1 is a plan of a machine constructed in accordance with this invention;

Fig. 2 is a front elevation thereof;

Fig. 3 is an end view;

Fig. 4 is a sectional view on the line 4—4 of Fig. 2;

Fig. 5 is a sectional view on the line 5—5 of Fig. 2;

Fig. 6 is a sectional view on the line 6—6 of Fig. 5;

Fig. 7 is a front view of the hopper with the plunger partly raised;

Fig. 8 is a sectional view of the chute on the line 8—8 of Fig. 7;

Fig. 9 is a sectional view on the line 9—9 of Fig. 2;

Fig. 10 is a sectional view on the line 10—10 of Fig. 9, and Fig. 11 is an enlarged detail, the same as the lower end of Fig. 5.

I have shown the invention as comprising a machine mounted on a frame 10 provided with a power shaft 11 at the top for receiving power through a pulley 12 thereon or in any other desired way. This shaft has upon it a worm 13 which operates a gear 14 on a cross shaft 15.

On the end of this shaft 15 is a bevel gear 16 operating a similar bevel gear on a shaft 17 on which is located a sprocket wheel 18. This sprocket wheel through a chain 19 operates another sprocket wheel 20 on a short shaft 21. This shaft has a bearing in a stationary frame 22 carried by a bracket 23 on the main frame 10. The shaft carries on the opposite end a bar 24 having thereon a pin 25. This pin is capable of moving back and forth in a slot 28 in a cross piece 27. In this cross piece 27 is a horizontal slide 26 to which the pin 25 is pivotally attached so that the pin can move the slide along and move the cross piece up and down at the same time. The cross piece 27 has a central block 29 thereon guided to move up and down in a vertical guide slot 30 in the frame 22. This confines the cross piece to a vertical motion.

The cross piece 27 is mounted on the bottom of a feed slide 31 extending up through a slot in the bottom of a hopper 32 in which are dumped the pins which are to be used. These pins are headed on one end and sharpened on the other. They lie in the hopper indiscriminately. It will be noted that the bottom of the hopper and the top of the slide 31 are inclined at an angle in such a degree that the pins will normally slide downwardly along these inclined surfaces.

This slide 31 is provided with a longitudinal slot 33 at the top having the same inclination, of course, as the top of the slide. A complete rotation of the shaft 21 lowers the slide 31 to the bottom of the hopper so that from one to twenty-five pins at the bottom will be received in the slot 33 and then raised by it to the point indicated in Fig. 2 hanging down vertically therein, held by their heads. This brings the slide to its highest position and brings it in line with a chute 34, the bottom of which is at the same angle as the top of the slide. The row of vertical pins on the slide 31 will slide down the chute into a trough 35. The trough 35 has a longitudinal slot through which the shanks of the pins may pass. Each one, therefore, hangs down, and as the head cannot pass through the slot, they are held in vertical position all the way along the trough. A slide 36 is located in the trough and moved in a manner to be described to push one pin at a time out of the trough so that it will slide down a chute 37.

On the shaft 15 is a cam or eccentric 40 operating on the top of a shaft 41 mounted to move vertically in a guide frame 49 and holding at the bottom a chuck 42 for a drill 43. This shaft has slidingly keyed to it a grooved pulley 44 and is adapted to be operated by a belt 45 passing over guide pulleys 46 and driven by a pulley not shown. Therefore, the shaft will rotate constantly as long as this pulley 44 is being driven. Also, as the shaft 15 rotates once the drill 43 will be depressed into the work and will then be withdrawn by springs 47 as the cam or eccentric 40 allows the shaft or plunger 41 to be raised.

Also mounted on the shaft 15 is another cam or eccentric 50. This operates also on a plunger 51 shown in Fig. 5 pressed upwardly by a spring 52 and moved down substantially in unison with the drill. This plunger 51 works in a head 53 which is carried by the frame and in a tubular member 54 held in adjusted position by a set screw 55. The tubular member has at the bottom a pair of pivoted jaws 56 which are pressed inwardly by springs 57 so as to normally assume the position shown in Fig. 5. Into the center of the tubular member extends the reduced end of the plunger. At the side is a chute 37 down which pins P are discharged into the passage between the jaws 50. These jaws are pivoted on studs 60 parallel with each other and they have beveled projections 61 on their lower ends which will hold the heads of the pins until they are forced down by the plunger, spreading the jaws.

The slide 36 which has been mentioned is operated by a cam 65 on the shaft 17. This actuates a lever 66 having an adjustable bearing head 67 and engaging the slide 36 at the other end. A pair of springs 69 pull the slide back when the cam permits it. These springs are connected with a stationary member 68 adjustable in and out as desired. Every time the plunger 36 moves inward it forces a pin along that passage into the chute 37 and allows it to descend into position for being engaged by the plunger and driven into the work as will appear.

On the end of the shaft 17 there is a bevel gear 70 meshing with a similar bevel gear 71 on an inclined shaft 72. This inclined shaft has at the bottom a segmental bevel gear 73 having only six teeth and meshing with a bevel gear 74 on a cross shaft 75. This gear 74, is not fixed on the shaft 75 but is fixed to a grooved wheel 76 and these two are located on a bushing 77 and free to turn thereon. This bushing and a ratchet wheel 78 thereon are pinned to the shaft 75. Extending part way around the grooved wheel 76 and fixed thereto at one end is a spring 79 for normally pulling this wheel and the gear 74 back whenever the part of the gear 73 without teeth comes into registration with it. When the gear is rotated forward, however, it takes with it, of course, the wheel 76 in opposition to the spring 79. On this wheel is a projection 80 carrying a pivoted ratchet lever 81 having a ratchet pawl 82 adjustably mounted thereon and adapted to be adjusted by a hand wheel 83 and screw 84. This pawl is in the path of the teeth on the wheel 78 and as the gear 74 is rotated positively the pawl will engage the teeth of the ratchet wheel 78 and turn it a certain distance. Then the propelling power is lost on account of the toothless space on the gear 73 coming into registration with the gear 74. When this happens the spring 79 draws this wheel 76 back until the projection 80 engages an adjustable stop 85 and the operation is ready to be repeated. This acts to turn the shaft 75 exactly through a predetermined arc and no farther.

The shaft 75 is provided with sprocket wheels 86 carrying two chains 87 which are supported by another pair of sprocket wheels 88 on a companion shaft 89. This furnishes an endless chain conveyor which has a series of rests 90 for the knife handles K. These rests are arranged to support the knife handles while they are being drilled and pinned. The whole endless conveyor can be adjusted back and forth by a hand wheel 91, a screw 92 and slide 93.

The operation of the device has been described in connection with the description of the several parts but it may be stated again that the belt 45 is intended to rotate constantly so that the drill 43 also rotates all the time. As the shaft 15 makes a complete revolution the drill 43 and plunger 51 both descend. The drill drills a hole about half way through one knife handle and the plunger forces a pin still deeper into a hole in the knife handle which has previously been drilled by the last downward motion of the cam 40. These pins as stated are fed down the chute 34 and brought forward one at a time by the plunger 36 into position for the operating plunger 51 to force them in. If it is necessary to put two pins in the handle, there are two drills 43 and two plungers 51 with the corresponding parts.

The rotation of the shaft 72 feeds the knife handles forward intermittently after they have been placed in the rest 90 by hand. After one of them is drilled it is fed forward just the distance between the drill and plunger at the next operation of the gear 73. These parts are all positively geared together so that the action of the drill and plunger are timed accurately with respect to the feed of the endless carrier and that feeds just the distance between the drill and plunger. In this way a hole is drilled in one handle and then that is moved along automatically to a position directly under the plunger and a pin is inserted by the plunger.

Although I have illustrated and described only a single form of the invention I am aware of the fact that modifications can be made therein by any person skilled in the art without departing from the scope of the invention as expressed in the claims.

Therefore, I do not wish to be limited to all the details of construction herein shown and described but what I do claim is:—

1. In a machine of the character described, the combination of a hopper for pins, a chute extending from said hopper at an inclination down which the pins are adapted to slide, a plunger located in said hopper, means for raising the plunger in the hopper, said plunger having an upper end inclined in the direction parallel to that of the chute so that it will receive and lift therein a row of pins when forced up through a mass of pins in the hopper, whereby said pins will be free to slide down the chute lengthwise, a trough at the bottom of the chute having means therein for receiving the pins and allowing them to retain a vertical position, a chute extending from the end of the trough, and a plunger movable through the trough to dislodge one pin at a time therefrom into the last named chute.

2. In a machine of the character described, the combination with a hopper for pins, a chute extending from said hopper at an inclination down which the pins are adapted to slide, a plunger located in said hopper, and means for raising the plunger in the hopper, said plunger having an upper end inclined in the direction of the chute and grooved so that it will receive and lift therein a row of pins when forced up through a mass of pins in the hopper and come into registration with the top of said chute, whereby said pins will be allowed to slide down the chute lengthwise, of a trough at the bottom of the chute having a central recess therein for receiving the points of the pins and allowing them to assume a vertical position, a chute extending from the end of the trough, a plunger movable through the trough to dislodge one pin at a time therefrom into the last named chute, a vertical hollow member into which said chute discharges, and a reciprocating plunger in said hollow member for engaging a pin discharged into the hollow member from the chute.

3. In a machine of the character described, the combination of a hopper, an inclined chute extending downwardly therefrom, means for automatically discharging pins from said hopper longitudinally into said chute, a trough at the bottom of the chute having means for holding each pin by its head in vertical position, a shaft, means connected with said shaft for operating the hopper, a plunger in the trough, means operated by said shaft for reciprocating said plunger timed with respect to the operation of the hopper so as to force one pin at a time out of the trough, a hollow member into which said pins are discharged, a plunger reciprocable in said hollow member, and means on said shaft for forcing the plunger down when the pin has been discharged from the trough into the hollow member.

4. In a machine of the character described, the combination with an endless carrier having rests thereon equally spaced apart for receiving the work, a pair of shafts on which said carrier is located, one of said shafts having a ratchet wheel fixed with respect thereto, a gear freely rotatable on said shaft, a gear for operating the first named gear having teeth arranged part way around it and adapted to be operated constantly, whereby the second gear will rotate intermittently, a grooved wheel connected with the gear on the shaft, yielding means for turning the wheel and gear in one direction, and a ratchet pawl movable with said grooved wheel for engaging the ratchet wheel and turning it a definite part of a revolution at each oscillation, whereby the rests will move a definite distance at each operation of the endless carrier.

5. In a machine of the character described, the combination with an endless carrier having rests thereon equally spaced apart for receiving the work, a pair of shafts on which said carrier is located, one of said shafts having a ratchet wheel fixed with respect thereto, a gear freely rotatable on said shaft, a gear for operating the first named gear having teeth arranged part way around it and adapted to be operated constantly, whereby the second gear will rotate intermittently, a grooved wheel connected with the gear on the shaft, yielding means for turning the wheel and gear in one direction, a ratchet pawl movable with said grooved wheel for engaging the ratchet wheel and turning it a definite part of a revolution at each oscillation, whereby the rests will move a definite distance at each operation of the endless carrier, a drill and a plunger located at a distance apart equal to the distance of movement of the endless carrier at each operation, and means positively connected and timed with said gears for moving the drill and plunger down to drill a hole in a piece of work on one rest and drive a pin into a previously drilled hole in a piece of work on another rest.

6. In a machine of the character described, the combination with an endless carrier having rests thereon equally spaced apart for receiving the work, a pair of shafts on which said carrier is located, one of said shafts having a ratchet wheel fixed with respect thereto, a grooved wheel loose on the shaft, yielding means for turning the wheel and gear in one direction, and a ratchet pawl movable with said grooved wheel for engaging the ratchet wheel and turning it a definite part of a revolution at each oscillation, whereby the rests will move a definite distance at each operation of the endless carrier.

7. In a machine of the character described, the combination with an endless carrier having rests thereon equally spaced apart for receiving the work, a pair of shafts on which said carrier is located, one of said shafts having a ratchet wheel fixed with respect thereto, a gear freely rotatable on said shaft, a gear for operating the first named gear having teeth arranged part way around it and adapted to be operated constantly, whereby the second gear will rotate intermittently, yielding means for turning the gear in one direction, and a ratchet pawl for engaging the ratchet wheel and turning it a definite part of a revolution at each oscillation, whereby the rests will move a definite distance at each operation of the endless carrier.

8. In a machine of the character described, the combination of a hopper, an inclined chute extending downwardly therefrom, means for automatically discharging pins from said hopper longitudinally into said chute, a trough at the bottom of the chute having means for holding each pin by its head in vertical position, a shaft, means connected with said shaft for operating the hopper, a plunger in the trough, and means operated by said shaft for reciprocating said plunger timed with respect to the operation of the hopper so as to force one pin at a time out of the trough.

9. In a machine of the character described, the combination with a hopper for pins, a chute extending from said hopper at an inclination, a plunger located in said hopper, and means for raising the plunger in the hopper, said plunger having an upper end grooved so that it will receive and lift therein a row of pins when forced up through a mass of pins in the hopper, of a trough at the bottom of the chute having a central recess therein for receiving the points of the pins and allowing them to assume a vertical position, a chute extending from the end of the trough, a plunger movable through the trough to dislodge one pin at a time therefrom into the last named chute, a hollow member into which said chute discharges, and a reciprocating plunger in said hollow member for engaging a pin discharged into the hollow member from the chute.

10. In a machine of the character described, the combination of a hopper for pins, a chute extending from said hopper at an inclination, a plunger located in said hopper, means for raising the plunger in the hopper, a trough at the bottom of the chute having means therein for receiving the pins from the plunger and allowing them to retain a vertical position, a chute extending from the end of the trough, and a plunger movable through the trough to dislodge one pin at a time therefrom into the last named chute.

In testimony whereof I have hereunto affixed my signature.

MARSHALL FARNSWORTH.